(No Model.)
H. G. TAYLOR.
CAR WHEEL.
No. 291,807. Patented Jan. 8, 1884.
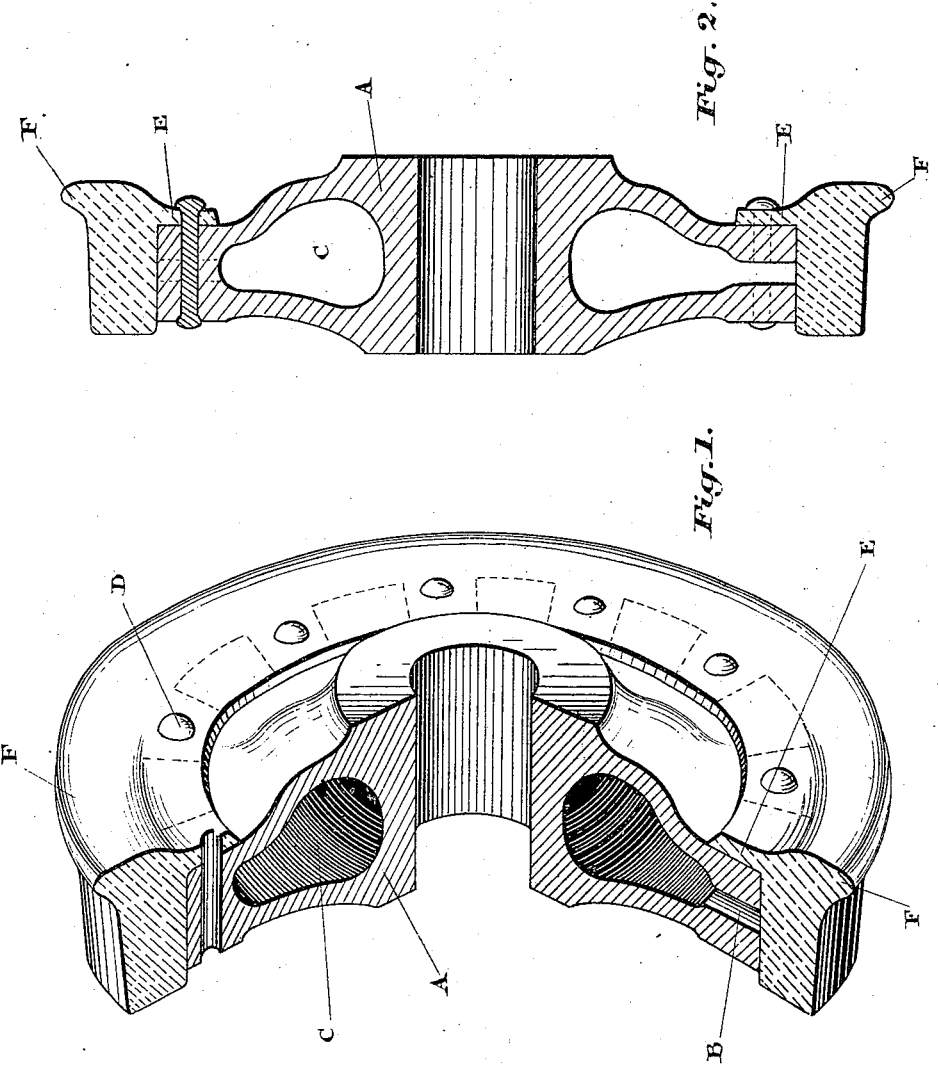
Witnesses.
Lewis Tomlinson
Chas. C. Baldwin
Inventor.
Harrison G. Taylor
by Donald C. Ridout & Co.
Attorneys

UNITED STATES PATENT OFFICE.

HARRISON G. TAYLOR, OF TORONTO, ONTARIO, CANADA.

CAR-WHEEL.

SPECIFICATION forming part of Letters Patent No. 291,807, dated January 8, 1884.

Application filed July 18, 1883. (No model.) Patented in Canada August 15, 1883, No. 17,495.

*To all whom it may concern:*

Be it known that I, HARRISON GATES TAYLOR, formerly of the town of Hampstead, in the State of New Hampshire, one of the United States of America, and now residing in the city of Toronto, in the county of York, in the Province of Ontario, Canada, mechanic, have invented certain new and useful Improvements in Metal Truck or Car Wheels; and I do hereby declare that the following is a full, clear, and exact description of the same.

The object of the invention is to make a cheap yet strong and durable truck-wheel; and it consists, essentially, in pressing an internally-flanged tire onto a peculiarly-formed metal center, the two being rigidly secured together by bolts or rivets passing through holes in the flange of the tire and through holes in the metal center, substantially as hereinafter explained.

Figure 1 is a perspective view of my improved truck-wheel, having a segment cut out of it to show the formation of the cored passages and bolt-holes. Fig. 2 is a vertical cross-section of my improved truck-wheel.

While I do not wish to confine myself to the use of a cast-metal center, I believe that a cast-metal center will be found preferable, and in illustrating my wheel I have therefore exhibited it with a cast-metal center. This center A has, it will be seen, the ordinary inner core, C, extending around the hub, to form an air-space between the hub and the outer rim of the center.

Instead of making holes through the inner face of the wheel for the purpose of removing the sand cast within the inner core, C, I make a series of cored passages, B, leading from the periphery of the center A to its inner core, C. These passages are located between the holes through which the bolts or rivets D pass, so as to form open spaces within the rim between the metal through which the said holes are pierced. These passages not only permit the removal of the sand from the core C, but tend greatly to strengthen the wheel, for in the event of the metal between one of the bolt-holes and the core cracking the said crack will not extend around the entire center. Moreover, the skin formed around the passages makes the metal at that point very much stronger. It will also be found that the open spaces leading from the inner surface of the tire to the hub of the wheel render the wheel less liable to retain heat caused by the application of the brakes.

It will be noticed that the internally-projecting flange E is formed immediately below the inner edge of the flange F of the tire. This location of the inner flange strengthens the tire at a point where strength is most required, and it admits of nearly the whole width of the tread being supported by the center.

I am aware of English Patents Nos. 2,102 of 1870, 1,196 of 1875, and 1,297 of 1875, and the United States Patent Reissue No. 1,317, and lay no claim to anything shown therein as forming part of my invention; but What I do claim as my invention is—

As an improved article of manufacture, the truck or car wheel herein described, consisting of the cast-metal center A, having an inner circular hollow core, C, extending to near its outer edge, forming two solid disks extending from the hub to the tire, and having cored passages B, leading from said inner core to the periphery of said center A, at regular intervals, leaving solid spaces between each passage, as shown, and the tire having internally-projecting flange E, formed integral therewith and immediately below the inner edge of the outer flange, F, said tire being securely fastened to the center A by bolts passing horizontally through the flange E and center, substantially as set forth.

Toronto, July 9, 1883.

H. G. TAYLOR.

In presence of—
 CHAS. C. BALDWIN,
 LEWIS TOMLINSON.